United States Patent [19]
Takahashi

[11] 3,741,388
[45] June 26, 1973

[54] METHOD FOR EFFICIENTLY SEPARATING SLURRY-STATE LIQUID INTO SOLID PART AND LIQUID PART AND AN APPARATUS THEREFOR

[75] Inventor: Kenji Takahashi, Suita, Japan

[73] Assignee: Kanegafuchi Boseki Kabushiki Kaisha, Tokyo, Japan

[22] Filed: Aug. 5, 1971

[21] Appl. No.: 169,330

[30] Foreign Application Priority Data
May 17, 1971 Japan.............................. 46/32412

[52] U.S. Cl...................... 210/67, 210/77, 210/386, 210/400
[51] Int. Cl............................................ B01d 33/04
[58] Field of Search ................. 210/66, 67, 77, 350, 210/351, 386, 387, 391, 400, 402, 401

[56] References Cited
UNITED STATES PATENTS

| | | | |
|---|---|---|---|
| 915,436 | 3/1909 | Hencke | 210/391 |
| 2,860,973 | 11/1958 | Wells | 210/396 X |
| 2,278,526 | 4/1942 | Rich | 210/386 |

FOREIGN PATENTS OR APPLICATIONS

| | | | |
|---|---|---|---|
| 123,534 | 12/1948 | Sweden | 210/386 |

*Primary Examiner*—Samih N. Zaharna
*Attorney*—Woodhams, Blanchard & Flynn

[57] ABSTRACT

A foam having inter-communicating fine pores throughout has a high liquid absorbing power and is rich in liquid-holding ability. When a slurry-state liquid is poured onto the surface of a liquid-permeable filter structure provided with such a porous layer having a good elastic recoverability from its compressed state, the liquid part of said slurry is absorbed in the foam structure due to the capillary action of the pores, whereas the mud-like solid part (wet cake) suspended in the slurry is retained on the surface of the porous layer in coagulated fashion and thus it is separated from the liquid part. By positioning a transfer means having a substantially even and smooth work surface so as to be in appropriate contact with the resulting layer of the solid part deposited on the sheet surface, the said solid part is transferred from the said sheet surface onto the work surface of the transfer means and is deposited thereon. Therefore, by causing this sheet structure to make continuous circulatory movement and also causing the transfer means which is positioned close thereto to move continuously at roughly the same speed and in the direction corresponding to the moving filter structure, and by continuously pouring the slurry-state liquid onto the foam surface, it is possible to continuously separate the said slurry into the solid part and the liquid part with a high efficiency. If the separating apparatus is arranged so that the filter structure is mounted on the circumference of a rotary drum body, the separating apparatus will conveniently have a compact size, requiring only a small floor area and space for its installation.

11 Claims, 5 Drawing Figures

PATENTED JUN 26 1973 3,741,388

INVENTOR.
KENJI TAKAHASHI
BY
Woodhams, Blanchard & Flynn
ATTORNEYS

METHOD FOR EFFICIENTLY SEPARATING SLURRY-STATE LIQUID INTO SOLID PART AND LIQUID PART AND AN APPARATUS THEREFOR

BACKGROUND OF THE INVENTION

1. Field of the invention

The present invention is concerned with a liquid/solid separator, and more particularly it relates to a method and an apparatus for mechanically separating, with a high efficiency, a slurry-state liquid of any kind into the solid part and the liquid part.

2. Description of the prior art

There are various kinds of known methods and apparatuses for separating a slurry-state liquid into the solid part and the liquid part. However, these conventional methods and apparatuses invariably show a difficulty in making a satisfactory separation of fine solid-containing slurry into the solid part and the liquid part. In the liquid/solid separation which is performed by the use of a vacuum separator or pressure filter device, there often occurs blocking of the meshes of the filter employed, which hampers the sound continuous separating or filtering operations. The prevention of such an inconvenience, however, requires a large motive power and/or complicated equipment.

More specifically, in the prior liquid/solid separating or filtering method relying on a sand bed, the apparatus as a whole requires a large area, and besides, the operation is limited considerably because of its dependency on the weather. Therefore, it is impossible to perform stable, constant and efficient operations.

In the prior liquid/solid separating or filtering method which uses a vacuum separator or filter, there is the inconvenience that no sound filtering is possible unless a coagulation assistant or so-called filter-aid in an amount almost equal to that of the solid part suspended in the liquid is used, and that the cost of the power required for driving the vacuum pump is not small and further that annoying noise arises during the operation.

On the other hand, the conventional pressure filtering method has the drawback that the filtering cloth provided in the conventional pressure filtering apparatus fails to perform perfect squeezing of the sludge on the filter cloth because of the high moisture-holding power of the sludge.

Another conventional filtering method utilizing gravity and using a sieve has the drawback that it is impossible to satisfactorily remove the liquid part from the slurry-state sludge. The sludge after being filtered by this method still contains as much as 90 percent of moisture, which means that the processed sludge contains 10 parts of solid part and 90 parts of liquid part.

The known centrifugal separator has the difficulty that, even with the addition of a substantially large amount of separation assistant or so-called filter-aid, the rate of removal of the solid part could be only 10 percent or less depending on the condition of the sludge. In addition, in case the operation is performed by a high speed rotation of the centrifugal separator, an additional special labor is required for the maintenance and control of the apparatus, and along therewith, there is the problem of noise.

Furthermore, the known activated sludge method has the defects that it requires a large floor area and space and a large equipment, plus there are the problems of breeding and feeding bacteria and of disposing the surplus sludge produced due to the excessive growth of bacteria, and thus no satisfactory treatment of sludge has been attained.

SUMMARY OF THE INVENTION

It is, therefore, an object of the present invention to provide an improved economical and efficient method for mechanically separating slurry-state liquid of any kind into the solid part and the liquid part, and an apparatus therefor.

Another object of the present invention is to provide an improved method as described above, which enables continuous operation of mechanically separating slurry-state liquid of any kind into the solid part and the liquid part without causing blockage of the filter members during the operation, and an apparatus therefor.

Still another object of the present invention is to provide a method and an apparatus therefor as described above, which require a relatively small floor area and space for the installation of the apparatus as compared with the prior art.

A yet another object of the present invention is to provide a method and an apparatus as described above, which require only a markedly small amount of coagulation assistant or filter-aid as compared with the liquid/solid separating or filtering method and apparatus of the prior art.

A further object of the present invention is to provide a method and an apparatus as described above, which is capable of performing satisfactory removal of the liquid part from the slurry-state liquid.

A still further object of the present invention is to provide a method and an apparatus as described above, which is free of the complicated process of breeding and feeding bacteria which are needed in the known activated sludge system.

A yet further object of the present invention is to provide a method as described above which comprises a simple process, and an apparatus therefor which is easy to operate and which is capable of easily separating even such kind of slurry-state liquid as has hitherto been considered difficult to separate into the solid part and the liquid part.

Another object of the present invention is to provide an apparatus for putting the aforesaid method into practice, which is of a simplified structure and free of annoying elements such as production of noise.

Still another object of the present invention is to provide a simplified means for firmly fastening together the adjacent opposing end portions of individual porous filter sheet members for use in the liquid/solid separating apparatus of the invention.

BRIEF DESCRIPTION OF THE DRAWINGS

The drawings show some examples of apparatus suitable for putting the method of the present invention into practice. It is to be understood that like parts are indicated by like reference numerals and symbols throughout the description and the drawings.

DESCRIPTION OF THE PREFERRED EMBODIMENTS

Description will be made first on the essential parts of the apparatus shown in FIG. 1.

Figure 1:
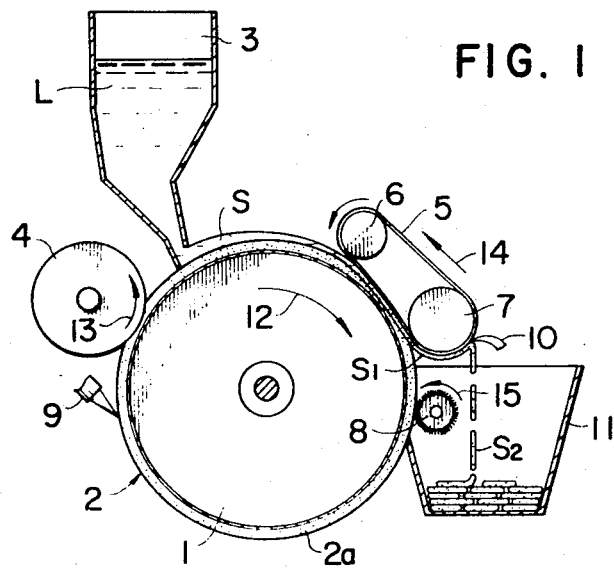
FIG. 1 is a side elevation, in section, of an example of a liquid/solid separating apparatus of the present invention, in which a liquid-permeable filter sturcture is mounted on the circumferential surface of a rotary drum body to provide a drum-shaped liquid-permeable filter structure, and in which the aforesaid transfer means is provided in the form of an endless belt.

In FIG. 1, reference numeral 1 represents a rotary drum body. This drum body 1 has a liquid-permeable filter structure generally indicated at 2. This filter structure 2 has a porous sheet member 2a made with a polyvinyl acetal foam having numerous inter-communicating pores formed throughout the entire foam structure. This filter structure 2 covers the entire circumference of the drum body 1. This polyvinyl acetal foam is of a high liquid-absorbing power in its moistened state due to the capillary action of the porous structure, and also a high wettability as well as a high liquid-holding ability. Furthermore, it has a satisfactory elastic power to recover its initial normal shape from its compressed state.

As will be discussed later, an excessively thin layer of this foam sheet will not bring about the desired effect. On the other hand, the use of an excessively thick porous sheet member 2a is not desirable either, from the economical point of view. Thus, the porous sheet member 2a requires to have a thickness of at least 5 mm as measured from its surface. When taking into consideration the liquid absorbing power and other factors such as economy, the porous sheet member 2a desirably is of a thickness of about 10 mm. It is mandatory that this sheet porous member 2a be of inter-communicating fine pores formed throughout thereof. From the practical point of view, however, it is preferred that the pores have an average diameter ranging from 0.5 to 1.0 mm. It should be understood, however, that pores having an average diameter in excess of 1.0 mm undesirably lack the ability of separating fine solid particles from the liquid in which they are suspended. It should be understood also that this porous sheet member 2a desirably has a porosity or void ratio of the order of 0.9. The desirable elastic recoverability of the porous sheet member 2a from its compressed state is such that, when any particular portion of this sheet member is considered as being a cubic block when it is in wet condition, this block will require a force ranging from 50 $g/cm^2$ to 300 $g/cm^2$ which is applied in opposite directions to the porous sheet relative to its face to reduce, as it is compressed by this force, its linear thickness to one half of that in its initial normal state. A preferred typical example of such a compression force is of the order of 200 $g/cm^2$, and this means that the porous sheet member 2a preferably has an elastic recoverability or a recovering force of this magnitude.

A porous polyvinyl acetal sheet material having the aforesaid physical property can be produced by acetalizing polyvinyl alcohol under an optimum reaction condition, i.e., at an optimum temperature and for an optimum period of time, with an aldehyde in the presence of an acidic catalyst and a pore-forming agent such as starch or dextrin each of which ingredients is selected appropriately with respect to type and amount. In the aforesaid reaction, the optimum temperature with which the mixture of the said ingredients is heated may be obtained by heating the mixture externally thereof, utilizing an electric heater, steam, hot liquid or other heating media, or alternatively the heating may be accomplished by the application of a DC or AC current directly to the above-mentioned mixture of ingredients. In this latter case, the mixture acts as a resistor and/or inductor, and the electric energy turns to heat according to Joule's law and/or the induction effect. The temperature is controlled as required by varying the voltage, current and frequency.

Also, it is advantageous to use at least one reinforcing member selected as desired from the group consisting of fibrous material such as cotton fibers, man-made fibers or synthetic resinous fibers; metal wires, non-woven webs and woven cloths.

Ordinary porous polyvinyl acetal sheet material in the dry state has little softness and flexibility. These desirable properties are imparted to this porous sheet material only while it is in the wet state. It should be understood, however, that a porous polyvinyl acetal sheet material which, even in dry state, is satisfactorily soft and flexible may be obtained by selecting the conditions of its manufacture. A porous sheet material which exhibits such a property in its dry state can of course be employed effectivey in the method of the present invention. In any case, it is ncessary that the porous sheet member has both of the aforesaid structure and physical property.

The said porous filter structure 2 applied around the drum body 1 is caused to move at a peripheral speed which desirably is of the order of 5 m/min. – 10 m/min., though this depends on the type of the slurry-state liquid and the amount of it that is fed.

Numeral 3 represents a feeder for supplying a slurry-state liquid L onto the surface of the porous sheet member 2a mounted on the said drum body 1. Numeral 4 represents a means for removing the liquid part absorbed within the porous structure of the foam sheet member 2a provided around the drum body 1. This liquid part removing means 4, in this embodiment, is provided in the form of a rotatable roll and disposed in the foreground of and below the feeder 3 in a spaced relation therewith so as to be in rotatable pressure contact with the surface of the porous sheet member 2a so that this rotatable roll 4 will squeeze out the liquid part from the porous foam structure in which the liquid part is contained and held. Numeral 5 represents an endless belt provided operatively sufficiently close to the porous sheet member 2a which is applied around the circumference of the drum body 1. This endless belt 5 serves as a transfer member in such a manner that the solid part deposited on the surface of the porous sheet member 2a is transferred therefrom onto the work surface of the endless belt 5 as the latter is brought into contact with the surface of the rotating porous sheet member 2a, and that the thus transferred solid part is carried on this endless belt away from the porous sheet member 2a. This transfer means or the endless belt 5 is applied between two guide rollers 6 and 7. This endless belt 5 may be substituted by a roll 20 which will be discussed later. In any case, however, the substantially smooth work surface of the transfer member 5 or 20 is constructed with a material such as natural rubber, synthetic rubber, synthetic resin such as polyvinyl chloride or polyurethane, or a combination of such a rubber or a resinous material and one of various kinds of woven or non-woven sheet material, and a metal sheet. The endless belt 5 shown in FIG. 1 is made with a soft polyvinyl chloride. At least one of the said guide rollers 6 and 7 is arranged in such a way that its bearing is supported for differential shifting in its position so as to alter its distance relative to the porous sheet member 2a to thereby desirably change the pressing force of the endless belt 5 against the porous sheet member 2a. These guide rollers 6 and 7 in this embodiment are not power-driven and they are left to be rotated as the endless belt 5 is brought into pressure contact with the sheet member 2a. Either one of these guide rollers 6 and 7, however, may be power-driven so as to control their speed of rotation.

It should be understood that the rotary drum body 1 according to the present invention is rotatably supported in a frame (not shown) in such a way that its central axis of rotation is positioned horizontal. The slurry-state liquid feeder 3 has a dispensing outlet which is positioned above the circumference of the drum body 1 in such a way that it is located above the horizontal plane passing through the central axis of rotation of the drum body 1 and faces the circumference of the drum body 1 at a site contained in the second quadrant or, in other words, between West and North, but closer to North, of a circle representing a cross section of the drum body 1. In this arrangement, the drum body 1 in each of the embodiments is rotated about its central axis of revolution in the direction indicated by an arrow 12 or 24 in the drawings as will be described later.

Numeral 8 represents a brush means for brushing off the solid part still sticking to that portion of the surface of the sheet member 2a which has passed the endless belt 5. In the first embodiment, this brush means 8 has a brush provided on a rotatable roller and is positioned close to or substantially in contact with the surface of the porous sheet member 2a which is made with a layer of foam and is provided on the circumference of the drum body 1. Numeral 9 represents a washing means provided ahead of the liquid part removing means 4 and in a spaced reration therewith and it has a washing liquid spray slit directed with an inclination toward the surface of the porous sheet member 2a so as to wash away the solid part still sticking to the surface of the filter structure 2 which has passed the brush means 8. Numeral 10 represents a scraper having a relatively sharp scraping edge which is positioned in such a way as to be able to scrap off the solid part deposited on the work surface of the running endless belt 5. Numeral 11 represents a collecting receptacle positioned below both the endless belt 5 and the brush means 8 for receiving and storing the solid part dropping from both the endless belt 5 and the brush means 8.

Description will hereunder be directed to the operation of the apparatus having the arrangement shown in FIG. 1. First, the layer of porous sheet member of the filter structure 2 applied around the circumference of the rotary drum body 1 is held in wet state and also is maintained in the state in which it has a desirable elastic power to restore its initial normal shape from its compressed state. In the foregoing state of the sheet member 2a, the drum body 1 is rotated in the direction of an arrow 12 by an appropriate prime mover such as an electric motor. Along with this, both the liquid part removing means 4 and the endless belt 5 assigned for transferring and carrying thereon the solid part from the sheet structure 2 are also rotated in the directions 13 and 14, respectively. In doing so, the respective surface peripheral speeds of the drum body 1, the liquid part removing means 4 and the endless belt 5 are arranged so as to be equal relative to each other. Also, as will be discussed later, the brush means 8 may be rotated in the direction of an arrow 15 as required.

Then, the slurry-state liquid is fed continuously from the feeder 3 onto the surface of the layer of porous sheet member of the filter structure 2 applied around the drum body 1. Whereupon, the major portion of the liquid part contained in the said slurry-state liquid is allowed to descend, by its own gravity, onto the filter structure 2 from the dispensing outlet of the feeder 3 to be absorbed in the said porous layer of foam sheet owing to the liquid absorbing power of this porous sheet member caused by the capillary action thereof. At the same time, the major portion of the solid part contained in the slurry-state liquid is separated and deposited, in coagulated fashion, on the surface of the said porous sheet member. As the solid part S which is thus deposited in coagulated fashion on the surface of the filter structure 2 passes the region of the endless belt 5 which is intended for transferring the solid part from the surface of the filter structure 2 onto the work surface of this belt 5, the said solid part deposited on the surface of the filter structure 2 is transferred onto the work surface of this endless belt 5. The resulting solid part $S_1$ now being carried on the work surface of the endless belt 5 is then scraped off by the scraper 10. The solid part $S_2$ thus scraped off the endless belt 5 is then allowed to drop into the collecting receptacle 11. It should be understood that, depending on the physical property of the solid part contained in the slurry-state liquid L, it is possible that a portion of the solid part which is being carried on the surface of the filter structure 2 remains there without being transferred onto the work surface of the endless belt 5 which, as stated previously, is assigned to take up the solid part from the surface of the filter structure 2. In such a case, the said residual portion of the solid part adhering in cake-like coagulated fashion to the surface of the layer of porous sheet member is brushed off by the brush 8 to be received in the collecting receptacle 11. This brush 8 is rotated at a peripheral speed which desirably is 1.2–1.5 times that of the surface of the sheet structure 2.

Furthermore, that region of the layer of porous sheet member of the filter structure 2 which has passed the brush means 8 is cleaned by an appropriate washing means 9, for example, by spraying clean water from a spray nozzle onto the surface of the said region. Thereafter, this cleaned portion of the layer of porous sheet member is passed, as the drum body 1 rotates, onto the liquid part removing means 4 where the washing water contained in the porous layer is removed. This liquid part removing means 4 may be a rotatable squeeze roll which is urged against the layer as the roll roates, to squeeze out the water from the porous layer. Alternatively, the washing water contained in the layer of porous sheet member may be removed by a vacuum suction means.

Though not shown, the liquid thus separated is collected by an appropriate means or it may be discarded. It should be understood also that the slurry-state liquid which is charged to the feeder 3 desirably is subjected, prior to being charged there, to a sorting process to sort out relatively large pieces of solid part by means of, for example, a vibrating sieve. Though not shown either, the drum face of the rotary drum body 1 may be constructed with a continuous metal plate or continuous synthetic resinous plate, or with a plate of any of the aforesaid types having a number of perforations formed therethrough in scattered fashion. In order to mount a filter structure 2 onto the drum body 1 — especially in case the drum body 1 has no perforated drum face — the filter structure 2 is not applied directly thereto, but desirably it is applied on top of one or two superimposed layers of appropriate net such as perforated metal plate of wire net.

The manner in which this filter structure 2 having a layer of porous sheet member is attached to the drum body 1 may be such that a continuous filter structure 2 is applied around the circumference of the drum body 1 or, instead, a plurality of individual small segments of porous sheet member are applied thereto. In this latter instance, the respective end portions of each segment are bent into the interior of the drum body 1 through narrow slits formed through the circumferential wall of the drum body 1, and the opposing adjacent end portions of these segments are fastened together. Also, it is desirable to provide — between the feeder 3 and the liquid part removing means 4 — means for arresting the flow of the supplied slurry-state liquid L along the surface of the filter structure 2 so as to face in the direction opposite to the direction of rotation of the rotating drum body 1. This may be attained by arranging the feeder 3 so that it has a lower end dispensing outlet which is of an appropriate structure to accomplish the said purpose in such a way that the feeder 3 is able to feed the slurry-state liquid L continuously in a desired amount and to concurrently serve to arrest the reverse flow of the material fed onto the surface of the filter structure 2. Or alternatively, the liquid part removing means 4 may be provided in the form of a rotatable squeeze roll and disposed close to the feeder 3 so that this liquid part removing means 4 is used concurrently as the reverse flow arresting means.

Therefore, if a slurry-state liquid L is separated into the solid part and the liquid part by the use of the apparatus shown in FIG. 1, there are obtained the conveniences and advantages that not only the operation is very much simplified and sure separation of the solid part from the liquid part is accomplished but also that there occurs no such blocking of the filter means as has been encountered for example in the vacuum filtering method. In addition, because the porous sheet member 2a employed in the present invention has pores of an average diameter of 1 mm or less, it is possible to separate even extremely fine solid particles. In particular, according to the method of the present invention, the porous sheet member 2a is made of a polyvinyl acetal material having numerous inter-communicating pores and is of a good elasticity to quickly restore its initial normal shape from its compressed state. This porous sheet member 2a is moistened prior to use. Thus, the porous sheet member 2a becomes rich in liquid-absorbing power due to capillary action of the porous structure. As a consequence, this porous sheet member 2a satisfactorily absorbs the liquid part contained in the slurry-state liquid. The aforesaid property plus the conditions of the porous sheet member 2a contribute all the more effectively to the satisfactory separation and deposition, in coagulated cake-like state, of the solid part thereon. Since the porous sheet member 2a is rich in elastic reconverability from its compressed state, the solid part which has coagulated in the form of a cake on the surface of the porous sheet member 2a is substantially perfectly transferred onto the work surface of the transfer member 5 and carried thereon, substantially without remaining on the surface of the porous sheet member 2a. Thus, the porous sheet member 2a according to the present invention exhibits a powerful function to separate the solid part from the liquid part.

Another feature of the apparatus shown in FIG. 1 is found in the rotary drum body 1. More specifically, it should be understood that, during the operation, the filter structure 2 provided around the circumference of the drum body 1 is rotated integrally with the latter. Thus, there occurs no slippage or meandering movement of the filter structure 2 relative to the drum body 1.

Moreover, the filter structure 2 has no such sharp U-turn portions as is seen in endless conveyor belt means. Thus the filter structure 2 causes no trouble or hinders the sound operation even when the drum body 1 is rotated at a very high speed. Accordingly, the liquid/solid separating operation can be achieved with a very high efficiency by the use of the apparatus shown in FIG. 1.

Also, the liquid-permeable filter structure 2 which has a porous sheet member 2a made with a layer of foam and which is provided around the circumference of the drum body 1 will never become slackened when it is impregnated with liquid. For this reason, the use of a filter structure 2 having a reinforcing member embedded in the layer of porous sheet material is especially desirable. Besides, a firm fastening and fixing of the opposing adjacent free end portions of this layer may be achieved by, for example, nippers without requiring a bonding agent. As such, the apparatus shown in FIG. 1 as a whole has a number of advantages such that it is simple in structure, that it requires no large cost for its installation and for the power which is needed for the operation, and that it serves to minimize the floor area for its installation.

Description will next be made on the apparatus shown in FIG. 2.

Figure 2:
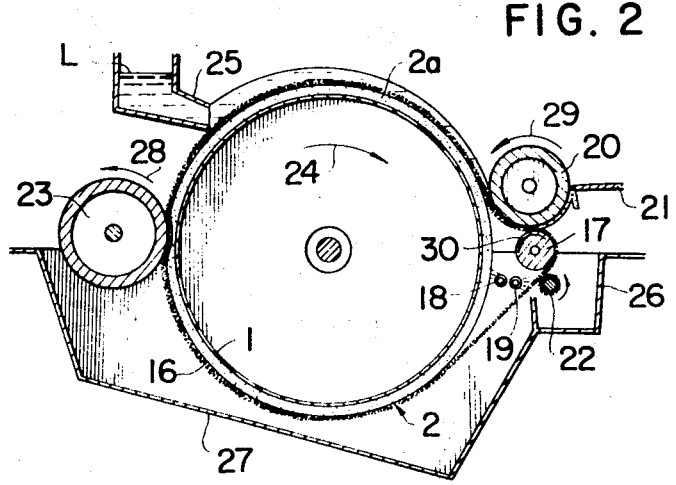
FIG. 2 is a side elevation, in section, of another example of a liquid/solid separating apparatus of the present invention in which the said filter structure is such that it comprises a porous sheet member mounted on a drum circumference and an auxiliary filter member applied onto the surface of this porous sheet member, and in which a transfer means is provided in the form of a roll.

Like the apparatus described above by referring to FIG. 1, this apparatus shown in FIG. 2 is provided with a liquid-permeable filter structure 2 on the circumference of a rotary drum body 1. This liquid-permeable filter structure 2 has a sheet member 2a made with a layer of intercommunicating porous material which is of a high liquid-absorbing power due to capillary action, a good wettability, a satisfactory liquid holdability and an excellent elastic recoverability from its compressed state. This sheet member 2a desirably is made with, for example, a polyvinyl acetal sponge having communicating fine pores throughout thereof.

Numeral 16 reprsents an auxiliary filter member which is applied onto and covers at least a major portion of the surface of the porous sheet member 2a made with a layer of foam. This auxiliary filter member 16 desirably is made with such a material as felt, filter cloth, perforated metal plate or wire net. The auxiliary filter member 16 may be simply wound around the entire surface of the porous sheet member 2a which, in turn, is mounted on the drum body 1. Or alternativey, the said auxiliary filter member 16 is imparted with tension by means of a tension roller 17 which is provided in a manner as illustrated. Also, the space defined by a portion of the surface of the porous sheet member 2a facing the tension roller 17 and portions of the belt of the auxiliary filter member 16 applied on the tension roller 17 is utilized for the provision of a washing liquid spray means 18 which may be a nozzle for spraying a washing liquid onto the exposed surface of the porous sheet member 2a and another washing liquid spray nozzle 19 assigned for spraying a washing liquid onto the rear surface of the auxiliary filter member 16, as illustrated.

Numeral 20 represents a roll which serves as a squeezing means for squeezing the slurry carried on the auxiliary filter member 16. This roll 20 concurrently has a function to transfer the solid part contained in the slurry carried on the auxiliary filter member 16 therefrom onto its own surface. For this reason, a scraping means 21 is provided close to this squeeze roll 20 for scraping the solid part that has been transferred onto the circumferential surface of the squeeze roll 20, off therefrom.

Numeral 22 represents a rotary brush means provided below the tension roller 17 and close to the auxiliary filter member 16 for brushing off the solid part adhering to the external surface of the auxiliary filter member 16 therefrom. Numeral 23 represents a liquid part removing means, corresponding to that indicated at 4 in FIG. 1, for remvoing the liquid part which has been adsorbed in the layer of porous material.

Description will hereunder be directed to the operation of the apparatus having the arrangement shown in FIG. 2. As an initial step, the layer of porous material of the sheet member 2a mounted around the circumference of the drum body 1 is held in wet state, and also it is maintained in a condition in which it has a good elastic recoverability from its compressed state. Under such conditions of the porous sheet member 2a, the drum body 1 is rotated in the direction of the arrow 24 by means of a prime mover such as an electric motor. Along with this, the liquid part removing means 23, the slurry-squeezing means 20 which concurrently serves as the transfer means, and the tension roller 17 are also rotated in the directions indicated by arrows 28, 29 and 30, respectively, at an equal peripheral velocity at thieir running surfaces. As will be discussed later, a rotary brush means 22 may be rotated, as required, in the direction of the arrow shown in FIG. 2.

Then, a slurry-state liquid L is fed continuously from the feeder 25 onto the surface of the auxiliary filter member 16 which, in this region, covers the porous sheet member 2a mounted around the circumference of the drum body 1. Whereupon, the majority portion of the liquid part contained in the slurry-state liquid is filtered by the auxiliary filter member 16 to be directed onto the layer of porous material of the sheet member 2a so that the liquid which is separated also at the surface of this layer is absorbed into the porous structure due to the liquid absorbing power of this layer caused by its capillary action. At the same time therewith, the major portion of the solid part contained in the slurry-state liquid is separated from the liquid part and is deposited, in coagulated cake-like fashion, on the exposed surface of the auxiliary filter member 16. As the solid part which has thus accumulated on the auxiliary filter member 16 passes the slurry-squeezing means 20, which may be a roll as shown, this layer of solid part is squeezed almost completely by the said squeezing means. Since the slurry-squeezing means 20 has a substantially smooth surface which is made with a material such as natural rubber, synthetic rubber, synthetic resin such as polyvinyl chloride or polyurethane, and metal, the surface of the said squeezing means 20 possesses a transferring action when it is in contact with the solid part. Thus, the solid part which is being carried on the auxiliary filter member 16 is transferrd onto the work surface of the said squeezing means 20 and is carried thereon as this squeezing means 20 moves continuously. The solid part which is now deposited on the moving surface of the squeezing-transferring means 20 is scraped off by a scraping means 21. The solid part thus scraped off is allowed to drop into an appropriate collecting receptacle 26. It should be understood that, depending on the type of the surface construction of the slurry-squeezing means 20 and also on the nature of the solid part contained in the slurry state liquid L, it could occur that all of the solid part which is being carried on the auxiliary filter member 16 is not transferred onto the work surface of the squeezing means 20 but a small portion of the solid part remains on the auxiliary filter member 16. In such a case, this solid part adhering in cake-like coagulated state to the auxiliary filter member 16 is brushed off by the rotating brush means 22 so that it will be collected in the said appropriate collecting receptacle 26. The rotary brush means 22 has a peripheral velocity which desirably is 1.2–1.5 times that of the auxiliary filter member 16.

In the apparatus shown in FIG. 2, both the layer of proous material of the sheet member 2a and the auxiliary filter member 16 are cleaned with a washing liquid such as a clean washing water which is sprayed thereto from both the washing liquid spray nozzles 18 and 19. Then, the washing liquid adhering to or absorbed in the auxiliary filter member 16 and the porous sheet member 2a is removed therefrom by the liquid part removing means 23, for example as a result of the pressure-contact rotation of the squeeze roll or through vacuum suction.

Though not shown, the separated liquid is collected in a receptacle 27 formed in the bottom of the frame of the apparatus by an appropriate means, or it may be discarded directly. It is desirable that the slurry-state liquid L which is charged to the feeder 25 be removed, before being charged thereto, of those relatively large pieces of solid part contained therein, by means of a vibrating sieve for example. Though not shown either, the drum face of the rotary drum body 1 may be constructed with a continuous metal plate or a continuous synthetic resinous plate, or it may be made with a plate of any one of the said types provided with a number of scattering perforations or numerous spaced narrow slits formed therethrough, depending on the type of the slurry-state liquid used.

As stated above, the apparatus shown in FIG. 2 is provided with a rotary drum body 1 having a sheet structure 2 comprising a layer of porous material around its entire circumference, and also comprising an auxiliary filter member 16 applied onto at least the major surface area of the said layer of porous material. Accordingly, it is possible to first cause the majority portion of the solid part contained in the slurry-state liquid L which is to be separted into the solid part and the liquid part to deposite cake-like coagulated fashion on the surface of the moving auxiliary filter member 16 and to cause the majority portion of the liquid part to be absorbed in the layer of porous material of the sheet member 2a. It should be understood that, since this auxiliary filter member 16 is made with a liquid-permeable material such as felt, filter cloth, metal net or wire net, the solid part can be separated from the liquid part and can become deposited in cake-like coagulated state thereon with great ease. On the other hand, the layer of foam of the porous sheet member 2a is made of a material which is of a high liquid absorbing power due to its capillary action and rich in wettability and liquid holdability. Accordingly, this sheet member 2a exhibits a markedly great ability of absorbing the separated liquid. Also, the said porous layer has an excellent elastic recoverability from its compressed state when it is wet. Therefore, the porous sheet member 2a is almost perfectly deprived — by the liquid part removing means 23 — of the liquid with which the porous layer is impregnated so that the porous sheet member 2a can quickly restore its initial expanded state with no difficulty. Furthermore, the apparatus shown in FIG. 2 is provided, close to the said auxiliary filter member 16, with a slurry-squeezing means 20 which concurrently serves as a transfer member. As a consequence, the separated solid part which is deposited in a cake-like coagulated fashion on the auxiliary filter member 16 is squeezed to further remove the adhering liquid part therefrom. Along with this squeezing action, the said squeezing means 20 can effect the transfer of this solid part thereto from the auxiliary filter member 16.

Especially, the essential part of the apparatus shown in FIG. 2 comprises a rotary drum body 1 and a liquid-permeable sheet structure 2 provided on the circumference of this drum body 1 and having a layer of porous material constituting a liquid-permeable sheet member 2a covering the said circumference of the drum body 1 and also having an auxiliary filter member 16 applied onto at least the major portion of said sheet member 2a. It should be understood that this rotary drum body 1 will never cause such slippage and meandering travel as has been encountered with an endless belt used in the prior art, nor will it give rise to any trouble at all even when this drum body 1 is rotated at a very high speed, because of the absence of any site of quick U-turn throughout its circumference. Thus, the liquid/solid separating operation can be performed with a very high efficiency. In addition, the porous sheet member 2a made of a foam and mounted around the drum body 1 will never become slackend when it is impregnated with liquid. Besides, the end portions of this porous layer can be firmly fastened together with ease by nippers or like means, without requiring any bonding agent. Thus, the apparatus shown in FIG. 2 is of a simplified structure as a whole, and the cost of installation and the cost of power for operation as well as the floor area and space of installation can all be minimized markedly as compared with the apparatus of the prior art. Thus, the apparatus shown in FIG. 2 which is another embodiment of the present invention has a number of advantages and conveniences. It should be understood also that the auxiliary filter member 16 which is applied onto the porous layer not only positively separates and deposits thereon in coagulated fashion the solid part of the slurry-state liquid L which is fed from the feeder 25, but also it serves to most desirably protect the porous sheet member 2a made with the said layer of porous material. Thus, this auxiliary filter member 16 provides a great advantage.

Description will next be made, by referring to FIGS. 3 through 5, on the manner in which the free end portions of the sheet member 2a of the sheet structure 2 are firmly fastened together with very great ease.

Figure 3:
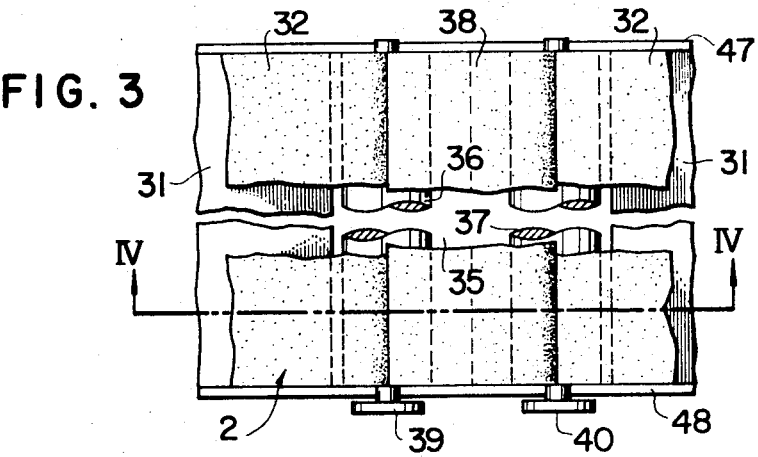
FIG. 3 is a fragmentary plan view, showing an example of the manner in which the adjacent opposing end portions of a porous sheet member are firmly fastened together and fixed by nipping means.
Figure 4:
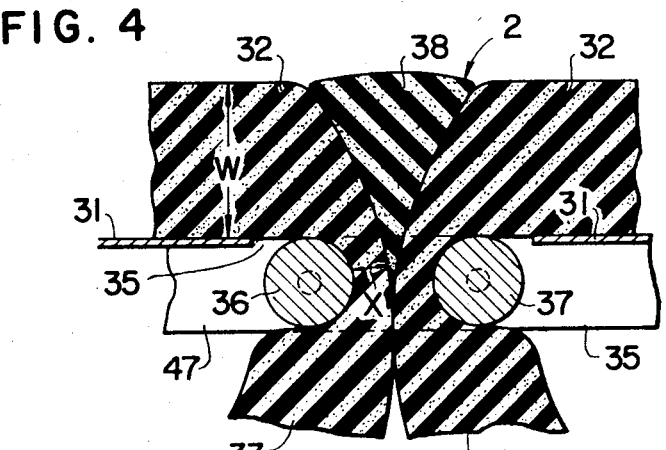
FIG. 4 is a sectional view taken along the line IV—IV in FIG. 3.

Referring now to FIG. 3 to FIG. 4, numeral 2 represents generally a porous sheet structure. Numeral 31 represents a supporting base member. Numeral 32 represents an intercommunicating porous sheet member whch in this instance is a polyvinyl acetal sponge sheet. The said supporting base member 31 has a slot-like discontinuous portion 35 in the region corresponding to the site at which the free end portions of the sponge sheet are to be fastened together. The distance between the two opposing free ends of the slot-like discontinuous portion 35 is such that it is enough for the two free end portions of the sponge sheet 32 to be inserted therein to face each other closely, as will be stated later. The said sponge sheet 32 is merely superimposed on the upper surface of the supporting base member 31. The two free end portions 33 and 34 of the sponge sheet 32 which are to be fastened together are each bent into the said slot-like discontinuous portion 35 so as to face each other closely.

These opposing two end portions of the sponge sheet 32 which are thus inserted in the slot-like discontinuous portion of the supporting base member 31 are then nipped by two spaced columnar rotatable nipping members 36 and 37 to be firmly fastened and fixed together thereby. These two nipping members 36 and 37 are rotatably supported between two opposite lateral frame members 47 and 48 of the supporting base member 31. These nipping members 36 and 37 are provided, at one end which projects beyond one 48 of the lateral frame members, with ratchet wheels 39 and 40, respectively, for checking the reverse rotation of the nipping members.

Though not shown in FIGS. 3 or 4, the frame member 48 located on the side where the ratchet wheels are provided has pawls 41 and 42 having their base portions pivotably secured to this frame member 48. These pawls 41 and 42 are adapted to engate the ratchet wheels 39 and 40, respectively. As shown in FIG. 5, the foremost end portions of these engageable pawls 41 and 42 normally are brought into engagement with a tooth of the corresponding ratchet wheels 39 and 40 by means of tension springs 43 and 44, respectively. As a consequence, the nipping members 36 and 37 are allowed to rotate only in one direction, namely, in the directions indicated by arrows 45 and 46, respectively, but these members are unable to rotate in the reverse directions. The rotation in the directions of the arrows 45 and 46 of the nipping members 36 and 37 shown in FIG. 5 works to cause the free end portions 33 and 34 of the sponge sheet 32 to be introduced with a greater positiveness into the slot-like discontinuous portion 35 of the supporting base membe 31.

The symbol x shown in FIG. 4 represents the reduced minimum thickness of the nipped portion of one end of the sponge sheet 32. This reduced thickness x is about one-half to one-sixth of the normal thickness w possessed by this sponge sheet when it is in the relaxed state.

As shown in FIGS. 3 and 4, the sponge sheet 32 having its two free end portions 33 and 34 nipped and fastened tightly by the nipping members 36 and 37 will never become slackened casually, or its nipped end portions 33 and 34 will never come loose or slip out of the slot-like discontinuous portion 35 of the supporting base member 31 spontaneously, because of the frictions produced between the contacting opposing surfaces of the fastened end portions of the sponge sheet 32 and also because of the frictions produced between the contacting surfaces of these end portions and the nipping members.

In order to minimize the recess which is apt to be formed between the opposing portions of the bent ends 33 and 34 located above the sites fastened together by the nipping members 36 and 37, it is only necessary to insert in this recess a piece 38 having a sectoral cross section and made with the same material as the sponge sheet 32 or with any other suitable material having an elastic recoverability from its compressed state, so that this sectoral piece is retained therebetween.

It is also advantageous to increase the surface friction of the nipping members 36 and 37 by providing a number of flaws or grooves in the circumferential surfaces of these cylindrical nipping members, or by the use of nipping members each being of a cylindrical shape having an oval cross section so that their nipping forces may be altered by changing their positions of revolution.

Description has been made on an instance where the sheet material having an elastic recoverability from its compressed state is a sponge sheet. It is needless to say that any other sheet material such as non-woven cloth and felt may be as equally effectively nipped and fastened firmly together as is the aforesaid sponge sheet provided that these other sheet materials are of an equally good elastic recoverability from their compressed state.

Figure 5:
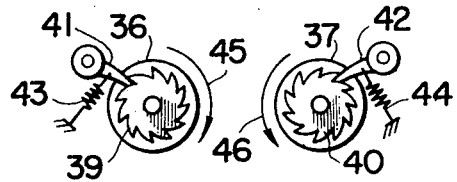
FIG. 5 is a side view of the nipping means shown in FIG. 3.

As stated above, the means shown in FIGS. 3 through 5 for fastening together firmly the free end portions of a sheet member 2a is such that the two free end portions to be fastened together of a sheet material such as sponge, having a desirable elastic recoverability from its compressed state are inserted in a slotlike discontinuous portion provided in the supporting base member, and that the resulting opposing end portions are nipped and fastened together firmly by two spaced nipping members. Therefore, this fastening means is of a very simple structure, and the nipping and fastening of the said end portions is effected by adroitly utilizing the frictions produced between the two contacting surfaces of the opposing end portions of the sheet member, and does not rely on the known fastening method which utilizes a bonding agent or stitching. Thus, the two end portions of the sheet member can be extremely positively and surely fixed.

Besides, the porous sheet member employed in the present invention is not required to be a single continuous lengthy material. Instead, it may be composed of a plurality of individual pieces of porous sheet material each having a relatively small length, which are fastened together to form a combined porous sheet member in the manner as described above. Such a combined porous sheet member will never slacken or come loose casually, or the nipped free ends of the individual pieces of sheet material will normally never slip out of the slot-like discontinuous portions of the supporting base member. Even when there arises a slackening in the porous sheet member, such a slack can be very easily returned to the initial tensioned state by a mere manipulation of the nipping members.

Next, description will be made on the result of tests on the effect of liquid/solid separating operation conducted according to the method of the present invention by the use of an apparatus shown in FIG. 1 which comprises a liquid-permeable filter structure made with a fiber-reinforced polyvinyl acetal sponge sheet material serving as the liquid/solid separating filter member and a transfer means having its transfer member made with a soft polyvinyl chloride sheet materail. The result is as shown in the following Table 1.

TABLE 1

| Type of sludge treated | SS* concentration (ppm) | Coagulation assistant (% for SS content) |
|---|---|---|
| 1. activated sludge from excrements disposal plant | 11,700 | 14 (ferric chloride) |
| 2. activated sludge from waste liquids at slaughter house | 11,500 | 16 (-"-) |
| 3. activated sludge from beer brewery plant | 4,470 | 5 (polyaluminum chloride) |
| 4. activated sludge from yeast mfg. plant | 17,800 | 7.5 (ferric chloride) 8.4 (pearlite)** |
| 5. activated sludge from antibiotics mfg. plant | 11,300 | 21 (ferric chloride) |
| 6. sludge from waste liquid at starch mfg. plant | 59,400 | 2 (alum earth) trivial (anionic polymer) |
| 7. sludge from waste liquids at paper mill A | 44,800 | nil |
| at paper mill B | 9,000 | 10 (alum earth) |
| 8. sludge from waste liquids at styrene beads mfg. plant | 386,000 | nil |
| 9. sludge from waste liquids at aluminum hydroxide plating plant | 27,200 | trivial (anionic polymer) 20 (slaked lime) |
| 10. Sludge from waste liquids at chromium hydroxide plating plant | 18,000 | trivial (anionic polymer) |

Remarks: * stands for 'Suspended Solid'.
** represents a commercial name of product obtained by heat-swelling mud-like perlite.

| | Percentage of SS removed | Liquid content of wet cake (%) | SS content of filtered liquid (ppm) |
|---|---|---|---|
| 1. | 92.0 | 84.2 | 210 |
| 2. | 95.0 | 85.6 | 93 |
| 3. | 91.7 | 80.4 | 94 |
| 4. | 97.5 | 85.3 | 90 |
| 5. | 90.4 | 81.4 | 298 |
| 6. | 94.0 | 67.6 | 917 |
| 7A. | 91.4 | 81.2 | 640 |
| 7B. | 95.2 | 78.8 | 129 |
| 8. | 90.0 | 30.3 | 1,800 |
| 9. | 96.4 | 81.9 | 150 |
| 10. | 93.6 | 76.2 | 145 |

In addition, similar tests were conducted by the use of a different type of transfer member of each operation, ie., those made with natural rubber, synthetic rubber and other synthetic resins, but the result of tests obtained showed no appreciable change from that listed in Table 1.

The method and the apparatuses according to the present invention have a number of advantages and conveniences as stated previously. Thus these method and apparatuses are most suitable for the liquid/solid separation of slurry-state liquids such as:

a. activated sludge and digested sludge from excrements disposal plant,
b. activated sludge and digested from city sewage,
c. activated sludge from waste liquids at community plant,
d. waste liquids and activated sludge from various industrial plants such as:
food industry, chemical industry, petrochemical industry, fiber industry, brewery industry, drug industry, fermentation industry, marine products processing industry, live stock meat processing industry, paper mill and pulp industry, civil engineering and construction industry, mining industry, metal working industry, and machine industry, and
e. slurry produced in various processes.

I claim:

1. A method of treating a sludge of waste materials to remove liquid from the sludge, comprising the steps of:
continuously moving a liquid-permeable layer through an endless path, said layer consisting essentially of wet, elastic, polyvinyl acetal foam having intercommunicating fine pores throughout the entirety thereof, said pores having an average pore diameter of less than about 1.0 mm and capable of passing liquid therethrough and retaining liquid therein, said layer having a thickness of at least about 5 mm;
at a feeding station located above said path at a selected location therealong, continuously feeding said sludge downwardly onto the outer surface of said layer, forming a continuous coating of said sludge on said layer, absorbing a portion of the liquid in said sludge into the pores of said layer and retaining same therein, the remainder of said sludge forming a coagulated cake on the outer surface of said layer;
at a transfer station located along said path downstream from said feeding station, continuously moving the substantially smooth and even surface of a transfer means at substantially the same surface speed and in the same direction as said cake and pressing same against the outer surface of said cake to compress said layer, and transferring the coagulated cake onto said transfer means;
allowing said layer to expand due to its own elasticity as soon as it has passed beyond said transfer means; and
at a liquid removal station located along said path downstream from said transfer station and prior to said feeding station, applying a force to said layer for removing liquid absorbed therein.

2. A method according to claim 1, in which, at the liquid removal station, said layer is compressed to expel water therefrom.

3. A method according to claim 1, in which, at the liquid removal station, vacuum is applied to said layer to withdraw liquid therefrom.

4. A method according to claim 1, in which, at the feeding station, a stream of sludge is continuously flowed downwardly onto said layer so that liquid in the sludge flows under gravity into the pores of said layer.

5. A method according to claim 1, in which said layer is moved through said path at a speed in the range of from about 5 to about 10 m/min.

6. An apparatus for treating sludge of waste materials to remove liquid from the remainder of the sludge, comprising:
a liquid permeable filter structure movable through an endless path, said filter structure having an outer liquid permeable layer consisting essentially of elastic, polyvinyl acetal foam having intercommunicating fine pores throughout the entirety thereof, said pores having an average pore diameter of less than about 1.0 mm and capable of passing liquid therethrough and retaining liquid therein, said layer having a thickness of at least about 5 mm;
feed means disposed above a selected position on said path for continuously feeding sludge onto the outer surface of said layer;
a movable transfer means positioned along said path downsteam from said feed means, said transfer means having a smooth and even transfer surface disposed for pressing engagement with the outer surface of the adjacent portion of said layer for compressing said layer, and means supporting said transfer means for movement in the same direction and at substantially the same speed as said layer, so that the remainder of the sludge can be transferred to said transfer means;
the zone of said path immediately following said transfer means being open so that said layer can elastically expand to its original thickness as soon as it has passed beyond said transfer means; and
liquid removal means positioned along said path downstream from said transfer means and before said feed means for removing liquid from said liquid before said layer again passes under said feed means.

7. An apparatus according to claim 6, in which the said liquid-permeable filter structure is provided on a rotary drum body having a horizontal axis of rotation, said feed means being positioned above said axis of rotation and adjacent an upwardly moving portion of the surface of the filter structure.

8. An apparatus according to claim 6, in which the apparatus further comprises washing means for washing said layer, said washing means being disposed between said transfer means and said liquid removal means.

9. An apparatus according to claim 6, in which the apparatus further comprises a brush roll positioned between said transfer means and said liquid removal means and located close to the surface of said layer for brushing off solids adhering to the surface of the layer.

10. An apparatus according to claim 6, in which the layer has therewithin at least one reinforcing material selected from the group consisting of fibrous materials, woven cloths and non-woven cloths.

11. An apparatus for treating a sludge of wastematerials to remove liquid from the remainder of the sludge, comprising:
a liquid permeable filter structure movable through an endless path, said filter structure having a liquid permeable layer consisting essentially of elastic, polyvinyl acetal foam having intercommunicating fine pores throughout the entirety thereof, said pores having an average pore diameter of less than about 1.0 mm and capable of passing liquid therethrough and retaining liquid therein, said layer having a thickness of at least about 5 mm;

an endless perforate auxiliary filter member encircling said layer and being disposed in snug contact therewith throughout most of said path for movement therewith;

feed means disposed above a selected position on said path for continuously feeding sludge onto said auxiliary filter member and the outer surface of said layer;

a movable tranfer means positioned along said path downstream from said feed means, said auxiliary filter member having a portion spaced from said layer in the zone adjacent said transfer means, said transfer means having a smooth and even transfer surface disposed in pressing engagement with the spaced portion of said auxiliary filter member, and means supporting said tranfer means for movement in the same direction and at substantially the same speed as said auxiliary filter member, so that the remainder of the sludge can transfer to said transfer means;

liquid removal means positioned along said path downstream from said transfer means and before said feed means for removing liquid from said layer before said layer again passes under said feed means.

* * * * *